Figure 1:
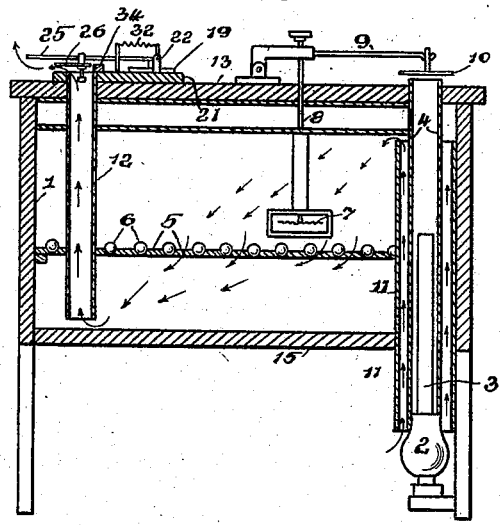

No. 855,107. PATENTED MAY 28, 1907.
A. E. LEAVENWORTH.
AUTOMATIC VENTILATION REGULATOR FOR INCUBATORS.
APPLICATION FILED FEB. 23, 1906.

WITNESSES
H. A. Lamb
S. J. Chaffee

INVENTOR
Alson E. Leavenworth
BY Geo. D. Phillips
his ATTORNEY

UNITED STATES PATENT OFFICE.

ALSON E. LEAVENWORTH, OF NEW HAVEN, CONNECTICUT.

AUTOMATIC VENTILATION-REGULATOR FOR INCUBATORS.

No. 855,107.          Specification of Letters Patent.          Patented May 28, 1907.

Application filed February 23, 1906. Serial No. 302,415.

*To all whom it may concern:*

Be it known that I, ALSON E. LEAVENWORTH, a citizen of the United States, and a resident of New Haven, in the county of New Haven and State of Connecticut, have invented certain new and useful Improvements in Automatic Ventilation-Regulators for Incubators, of which the following is a specification.

My invention relates to an automatic ventilation regulator for incubators.

The principal difficulty experienced in artificial hatching at the present time, is in maintaining the proper circulation of air within the incubator. There are plenty of devices in use for automatically and accurately regulating the temperature of the interior of the incubator, but no device is in use or on the market for automatically regulating the ventilation or circulation of the air through the incubator through the medium of the outside temperature.

The method employed at present is to provide an opening at the bottom of the incubator for the admission of air, which air passes over the eggs and out through an opening at the top. A thermometer is hung in the room where the incubator is placed and manually operated slides are used in connection with these ventilator holes or openings to open and close the same as the thermometer rises or falls in accordance with the temperature outside of the incubator. There is a certain quantity of moisture in an egg which if carried off by allowing the evaporation to proceed too freely, the chick will die, and if an excess of oxygen is admitted during the process of incubation, it will result in an over development of the chick. It will, therefore, be readily seen that when the ventilation is to be regulated by hand throughout the whole period of incubation, it would be impossible to expect the best results. In fact, the results show that not more than sixty per cent. of the fertile eggs are hatched by the present method, while the use of my improved automatic device will give a result of nearly one hundred percent. In some instances, felt is placed over these ventilator openings through which the air passes and is varied in thickness to suit the outside temperature, but, as this is also a hand method, it is subject to the same disadvantage as the slides and gives no better results.

My automatic ventilation regulator is operated entirely by the temperature outside of the incubator, and is set to close down at thirty-two degrees outside temperature, regardless as to what the temperature may be within the incubator, in fact, it has nothing whatever to do with regulating the inside temperature but only to regulate the current of air passing through the incubator. The shut-down at thirty-two degrees is not a complete shut-off of the circulation, but simply to reduce the current to conform to the requirements necessary for successful hatching in accordance with and through the medium of the outside temperature.

Figure 2:
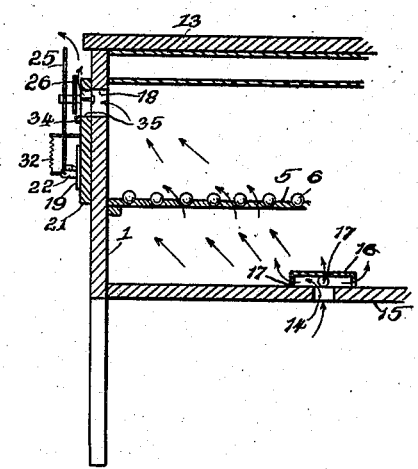

To enable others to understand my invention reference is had to the accompanying drawings in which:

Figure 1—represents a sectional elevation of an ordinary incubator with my improved ventilating device attached at the top. Fig. 2—is a broken sectional view of an incubator showing my device attached to the side.

Its construction and operation are as follows:

Although the incubator forms no part of my present invention, I will, however, give a brief description of the same to show the operation of my regulator in connection therewith.

1 is the body of the incubator. 2 the ordinary heating lamp having the chimney 3 projecting within the heat tube 4. 5 the wire egg rack and 6 the eggs.

7 is a flexible diaphragm or thermostat within the egg chamber and is connected to the vertical rod 8 whose upper end is connected with the fulcrumed arm 9 carrying the valve 10 adapted to cover or uncover the upper open end of the heat tube 4 in accordance with and through the medium of the temperature in the egg-chamber.

The cold air adapted to circulate through the egg-chamber may either be admitted up through the outer tube 11, Fig. 1, surrounding the heat tube 4, and into the egg-chamber as indicated by the arrows, and thence up through the tube 12 opening to the outer air from the top 13 of the incubator, or it may be admitted through the hole 14, Fig. 2, formed in the bottom 15 of the incubator and into the cap 16, passing through the holes 17 in the side of the cap into the egg-chamber; thence through the wire egg-rack in the direction of the arrows and escaping through the opening 18 to the outer atmosphere.

It will be readily seen that it would be an utter impossibility to adopt any standard size for the air inlet or outlet to meet the ever changing conditions of the outside atmosphere. As before stated, a hand operated slide has been used to regulate this air circulation in accordance with the outer temperature but this too, has proved ineffectual owing to the fact that, a constant attendance would be impracticable, and just when the slide needed shifting, there might be no one on hand to attend to it.

19 is a thermostat of ordinary construction adapted to expand or contract under the slightest change of the outer atmosphere.

25 is a valve rod suitably connected with the thermostat and 26 is the valve adjustably mounted on the rod 25.

34 is a heat protector rising from the top of the base 21 and on a line with the inner wall of the hole 35 in said base to prevent the air from the interior of the egg-chamber coming in contact with the sensitive thermostat 19 and cause the same to be affected by the temperature of the inside of the egg-chamber rather than from the outside temperature, as it is from the outside temperature only that the results sought for can be obtained.

Operation. The device is secured to the incubator either on the top, side or bottom, and either at the inlet or outlet as may be most convenient, with the hole 35 of the base 21 over the hole in the incubator. The valve 26 is adjusted to close down at thirty-two degrees outside temperature. The device is so arranged and adjusted with respect to the opening that the closing down of the valve will not entirely check the circulation of air through the egg-chamber but only regulate the flow or current. When the valve is at its lowest point it will leave sufficient opening to maintain the proper circulation at thirty-two degrees outside temperature. If the outside temperature rises in the slightest degree the valve will instantly respond and rise accordingly and thus permit a larger volume of air to circulate through the egg-chamber, and the volume of air, whether more or less, will be in exact accordance with the proper proportion necessary to secure the best results. As before stated, the present method of hand regulating only gives a result of about sixty percent. of fertile eggs hatched, while with my automatic regulator ninety-six to one hundred percent is easily attained, and that too, without the slightest care or attention after once being adjusted.

As the outside temperature is liable to remain for some time at thirty-two degrees, it will readily be seen that to entirely close the opening would counteract and defeat the very object of my invention which is, as before mentioned, to maintain a uniform circulation of air through the egg-chamber under the varying temperature of the outside atmosphere, therefore, the current of air through the egg-chamber must never be entirely shut off, and it will never be with the valve arranged to act as I have shown it.

If the device is to be attached to new incubators the base 21 may be dispensed with if so desired.

While I show a certain form of thermostat it will be understood that any kind of a thermostat that is sufficiently sensitive to the changes of the outside temperature could be used.

Having thus described my invention what I claim as new and desire to secure by Letters Patent is:

1. In combination with an incubator having an egg-chamber and ventilator openings for the ingress and egress of air to and from the egg-chamber, a valve located over one of said openings, means for actuating the same entirely by the temperature outside of the incubator so as to regulate but not completely shut off the current of air passing through the incubator, for the purpose set forth.

2. In an automatic ventilation regulator for incubators, a base having an opening therethrough, a valve operatively overlying said opening but not fully closing the same, a thermostat adapted to be influenced by the temperature outside of the incubator and operatively connected with the valve, means for maintaining said connection, a shield to protect the thermostat from the air escaping from the incubator, for the purpose set forth.

3. In an automatic ventilation regulator for incubators having an egg-chamber and ventilator openings for the ingress and egress of air to and from the egg-chamber, of a valve overlying one of said openings but not fully closing the same, a supporting-rod therefor, a rock-shaft to actuate said rod, a thermostat adapted to be actuated by the temperature outside of the indicator, means to adjustably connect the valve rod with said thermostat, a shield to protect the thermostat from the air escaping from the incubator, for the purpose set forth.

Signed at Bridgeport in the county of Fairfield and State of Connecticut this 20th day of Feb. A. D. 1906.

ALSON E. LEAVENWORTH.

Witnesses:
R. SHERWOOD,
G. DROUVI.